United States Patent
Reiman et al.

(10) Patent No.: US 8,857,893 B2
(45) Date of Patent: Oct. 14, 2014

(54) INTERMODAL CHASSIS SIDE FAIRING SYSTEM

(75) Inventors: James Reiman, Winnetka, IL (US);
Peter Heppel, Paris (FR); Christopher Vipperman, Livonia, MI (US)

(73) Assignee: Aerofficient, LLC, Livonia, MI (US)

( * ) Notice: Subject to any disclaimer, the term of this patent is extended or adjusted under 35 U.S.C. 154(b) by 0 days.

(21) Appl. No.: 13/526,280

(22) Filed: Jun. 18, 2012

(65) Prior Publication Data

US 2013/0313856 A1 Nov. 28, 2013

Related U.S. Application Data

(60) Provisional application No. 61/651,345, filed on May 24, 2012.

(51) Int. Cl.
*B62D 35/02* (2006.01)
*B62D 35/00* (2006.01)

(52) U.S. Cl.
CPC .................... *B62D 35/001* (2013.01)
USPC .................... 296/180.4; 296/180.1

(58) Field of Classification Search
CPC .. B62D 35/001; B62D 35/002; B62D 35/008; B62D 35/02
USPC .............. 296/180.1–180.5; 180/903
See application file for complete search history.

(56) References Cited

U.S. PATENT DOCUMENTS

| | | | | |
|---|---|---|---|---|
| 3,401,953 | A | * | 9/1968 | Prohl et al. .................. 280/851 |
| 4,035,013 | A | | 7/1977 | Abbott, III |
| 4,205,861 | A | * | 6/1980 | Roberts et al. ............... 280/851 |
| 4,531,788 | A | | 7/1985 | Teramachi |
| 4,585,262 | A | * | 4/1986 | Parks ........................ 296/180.1 |
| 5,609,384 | A | * | 3/1997 | Loewen ..................... 296/180.4 |
| 5,921,617 | A | * | 7/1999 | Loewen et al. ............ 296/180.4 |
| 6,644,720 | B2 | * | 11/2003 | Long et al. ................. 296/180.4 |
| 6,799,791 | B2 | | 10/2004 | Reiman et al. |
| 7,404,592 | B2 | | 7/2008 | Reiman et al. |
| 7,604,284 | B2 | | 10/2009 | Reiman et al. |
| 7,748,772 | B2 | * | 7/2010 | Boivin et al. .............. 296/180.4 |
| 7,942,466 | B2 | * | 5/2011 | Reiman et al. ............ 296/180.4 |
| 8,413,937 | B2 | * | 4/2013 | Di Franco .................... 248/201 |
| 2006/0152038 | A1 | | 7/2006 | Graham |
| 2009/0212596 | A1 | | 8/2009 | Reiman et al. |

FOREIGN PATENT DOCUMENTS

WO  2011097466 A1  8/2011

OTHER PUBLICATIONS

International Search Report mailed Mar. 3, 2011, in corresponding International Application No. PCT/US2011/023728.

\* cited by examiner

*Primary Examiner* — Dennis H Pedder
(74) *Attorney, Agent, or Firm* — Fitzpatrick, Cella, Harper & Scinto

(57) ABSTRACT

A trailer or intermodal trailer chassis having a vehicle side fairing that accommodates, without being damaged, a container or other object lowered onto the trailer or intermodal chassis in a misaligned orientation.

20 Claims, 4 Drawing Sheets

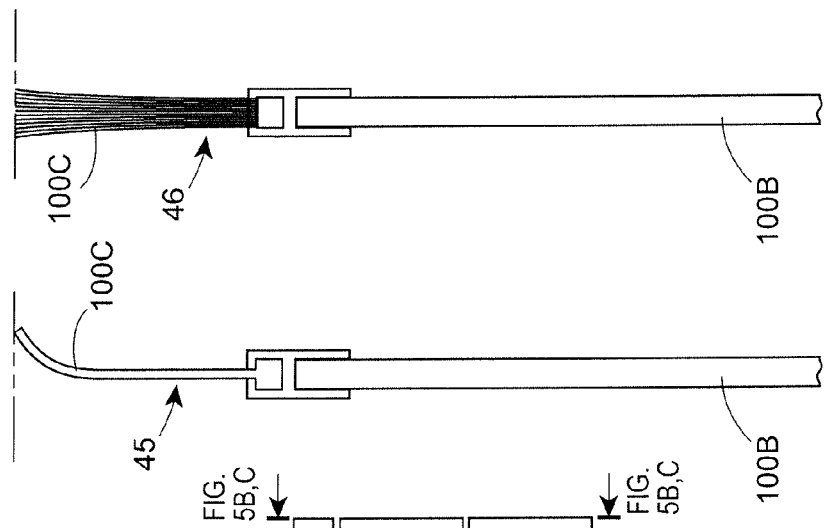

INTERMODAL CHASSIS SIDE FAIRING SYSTEM

CROSS REFERENCE TO RELATED APPLICATIONS

This application claims benefit from U.S. Provisional Application No. 61/651,345, filed May 24, 2012, the entire contents of which are incorporated by reference herein.

BACKGROUND OF THE INVENTION

1. Field of the Invention

This invention relates to a system for improving the aerodynamic profile of vehicles by utilizing side vehicle fairing structures, especially for use on an intermodal chassis used to transport intermodal shipping containers by road ("Chassis" or "Chasses"). Additionally, the system can be employed on any trailer used in a tractor-trailer combined vehicle ("Truck"). The system improves fuel consumption without having a material adverse impact on operation or service procedures pertinent to the Truck.

2. Description of Related Art

The amount of power needed to move a vehicle over land or through the air increases with the speed of the vehicle due to aerodynamic drag. The amount of power necessary to overcome aerodynamic drag directly translates into increased fuel consumption, and thus increased emission of greenhouse gases and pollutants, and increased cost of operation.

A variety of innovations aimed at reducing the aerodynamic drag of various transport vehicles, including tractor-trailer combinations, have been introduced in the prior art. These include efforts to make the hood, windscreen, fenders, etc. more streamlined in form, as well as by adding fairings to the cab roof, and in some cases, to the trailer when the trailer is a "box" van or refrigerated heavy duty truck trailers. Hereinafter standard van and refrigerated "box" heavy duty truck trailers shall be referred to as "Van Trailer(s)".

U.S. Pat. No. 6,799,791 discloses a vehicle fairing structure that can be deployed on the rear of a Van Trailer box to reduce drag at the rear end of the Van Trailer box. Since a significant amount of drag is also associated with the front of the Van Trailer box, where there is known to be an area of high pressure and relatively stagnant air approximately at the middle of the forward vertical face of the trailer cab, a front fairing structure for reducing this drag is disclosed in U.S. Pat. No. 7,604,284.

It is also the case that significant drag results from air entering under the Van Trailer, between the box and the road surface. A system that includes side fairings to reduce drag such is disclosed in U.S. Pat. No. 7,404,592. The foregoing patent and applications (The disclosures of U.S. Pat. Nos. 6,799,791, 7,604,284 and 7,404,592 are incorporated herein by reference.

While the foregoing side fairing systems are suitable for Van Trailer boxes, a significant amount of freight is moved using intermodal systems. In such systems, the trailer box is a separate component from the trailer chassis, so that multiple boxes (referred to as containers) can be stacked on container ships or flatbed railcars and single containers can be mounted on trailers for transit by Truck. When the containers are moved between their originating/final destinations by road or Truck, Chasses specially designed to accommodate the container are utilized. A crane or a forklift is typically used to lift a container on to and off of the Chassis.

Utilizing a side fairing in an intermodal application to reduce aerodynamic drag is challenging, because the design needs to take into account the foregoing modes of operation. To permit easier movement and stacking of containers, it may be desirable to secure the side fairing to the Chassis rather than the container. However, any side fairing design must take into consideration that the container may be lowered onto the Chassis in a tilted or otherwise imperfect orientation, thereby striking the fairing.

Intermodal containers are typically made of steel and are of robust, heavy construction so that they can withstand the rigors of being moved multiple times while securely protecting and supporting the freight that they carry. As a consequence, there is risk of damage to any side fairing mounted on the Chassis should the container be lowered onto the Chassis in any imperfect orientation. Perfect lifting/lower and perfect alignment of the container to the Chassis cannot always be achieved.

SUMMARY OF THE INVENTION

The present invention functions to permit the attachment of fairings or other structures to Chasses, or any trailer wherein the support for the fairing or other structure is exposed to the load to be carried by such trailer, and may be damaged during imperfect loading.

In one embodiment, the intermodal trailer chassis, which comprises a beam and bogie wheels mounted thereon, and which defines a spatial gap forward of the wheels between the bottom of the container and the road surface, has a side fairing panel secured to the Chassis proximate to such gap. The side fairing panel is secured to the Chassis by a bracket comprising a strut having an inner portion and an outer portion, where the inner portion of the strut is rigidly secured to the beam, and the outer portion is rigidly secured to the side fairing panel. The top edge of the side fairing is proximate to the plane defined by the bottom of an intermodal container when such a container is mounted on the Chassis. The inner portion of the strut is rotatably fastened to the outer portion of the strut, so that, in the event that a container is lowered onto the Chassis in a misaligned orientation, the side fairing panel will be displaced away correspondingly, thereby avoiding damage.

In a second embodiment, the intermodal trailer chassis, which comprises a beam and bogie wheels mounted thereon, and which defines a spatial gap forward of the wheels between the bottom of the container and the road surface, has a side fairing panel secured to the Chassis proximate to such gap, wherein the side fairing panel comprises an upper sub-panel have an edge and a lower sub-panel. The edge of the upper sub-panel is proximate to the bottom of the container, and the lower sub-panel of the side fairing panel is secured to the Chassis by a strut having an inner portion and an outer portion. The inner portion of the strut is rigidly secured to the beam, the outer portion is rigidly secured to the side fairing panel, and the upper sub-panel is rotatably or flexibly mounted to the lower sub-panel so that, in the event that a container is lowered onto the Chassis in a misaligned orientation, the upper sub-panel of the side fairing panel will rotate away correspondingly, thereby avoiding damage.

In a further embodiment of the present invention, there is provided a chassis or trailer having one or more generally longitudinal structural beams and bogie wheels attached thereto, either directly or indirectly via a bogie wheel mounting assembly. The longitudinal beam(s) are generally oriented in the direction of travel, and the chassis or trailer when placed on a road surface defining a spatial gap forward of the wheel set between the road surface and the bottom of the trailer or load to be carried by the chassis. The chassis or trailer is provided with a side fairing system comprising a side fairing panel secured to the trailer or chassis proximate to such gap, the side fairing panel having an edge proximate to the bottom of the trailer or the top plane of the chassis where the bottom of an intermodal container would be. The side fairing panel is secured to the trailer or chassis by one or more strut(s) having an inner portion and an outer portion, where the inner portion of each strut is rigidly secured to the trailer or chassis, and the outer portion rigidly secured to the side fairing panel, and the strut is elastic, thereby permitting the side fairing panel to deflect in the vertical direction in response to a correspondingly oriented force component, and then return to its undeflected orientation upon removal of the force component.

In another embodiment, the intermodal trailer chassis, which comprises a beam and bogie wheels mounted thereon, and which defines a spatial gap forward of the wheels between the bottom of the container and the road surface, has a side fairing panel secured to the Chassis proximate to such gap, wherein the side fairing panel comprises an upper sub-panel having an edge and a lower sub-panel. The edge of the upper sub-panel is proximate to the bottom of the container, and the lower sub-panel of the side fairing panel is secured to the trailer chassis by a strut having an inner portion and an outer portion. The inner portion of the strut is rigidly secured to the beam, the outer portion is rigidly secured to the side fairing panel, and the upper sub-panel is made of an elastic material which returns to its original position after impact so that, in the event that a container is lowered onto the Chassis in a tilted orientation, the upper sub-panel of the side fairing panel will bend away correspondingly, thereby avoiding damage.

In a further embodiment, the intermodal trailer chassis, which comprises a beam and bogie wheels mounted thereon, and which defines a spatial gap forward of the wheels between the bottom of the container and the road surface, has a side fairing panel secured to the Chassis proximate to such gap, wherein the side fairing panel comprises an upper sub-panel having an edge and a lower sub-panel. The edge of the upper sub-panel is proximate to the bottom of the container, and the lower sub-panel of the side fairing panel is secured to the Chassis by a strut having an inner portion and an outer portion. The inner portion of the strut is rigidly secured to the beam, the outer portion is rigidly secured to the side fairing panel, and the upper sub-panel is made of a bristle or other flexible multi-part material which returns to its original orientation after impact, so that, in the event that a container is lowered onto the Chassis in a tilted orientation, the upper sub-panel of the side fairing panel will bend away correspondingly, thereby avoiding damage.

BRIEF DESCRIPTION OF THE DRAWINGS

FIG. 2 is a planar view of the side fairing panel of the present invention.

FIGS. 5A, 5B and 5C depict side views of three different types of upper sub-panels of the side fairing panel in certain embodiments.

DETAILED DESCRIPTION OF THE PREFERRED EMBODIMENTS

Figure 1:
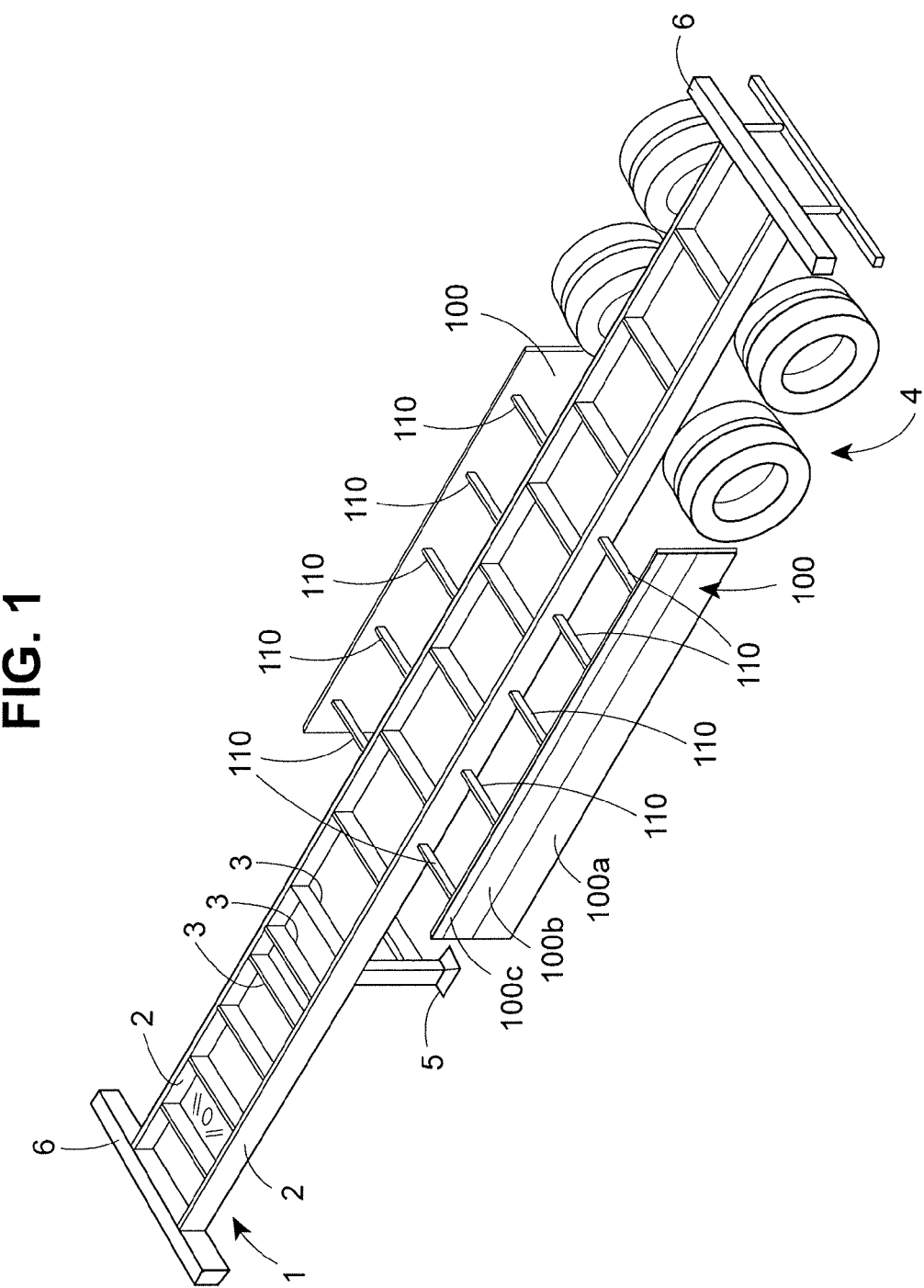
FIG. 1 is a schematic perspective view of an intermodal Chassis with the vehicle side fairing panel comprising the present invention depicted thereon.

FIG. 1 depicts a Chassis 1, which generally comprises two I-beams 2 approximately twelve inches deep, spaced apart by plural cross members 3. A dual-axle bogie 4 is positioned toward the rear of Chassis 1 and a square-legged extendible landing gear 5 is positioned toward the front of Chassis 1, aft of the kingpin to which a heavy duty truck tractor ("Tractor") can be pivotally secured. Two cross beams 6 are also provided on which a container may rest during transport. FIG. 1 also depicts Landing Gear 5 of Chassis 1, which permits a Chassis to sit level and to allow elevation of the Chassis so that a Tractor (not shown) can be attached to and detached from a Chassis.

FIG. 1 depicts Chassis 1 with two side fairings 100 as described herein, one for each side of Chassis 1. The purpose of side fairings 100 is to inhibit air from entering the underside of Chassis 1, and generally to smooth the flow of air thereby reducing aerodynamic drag. Side fairings 100 can comprise two or more horizontal panels joined together directly or indirectly such that the multiple panels function as a single aerodynamic panel.

Side fairings 100 are generally rectangular planar structures extending in the vertical direction downward to a relatively small distance above the road surface. In one embodiment, approximately 8 inches of clearance is left between the bottoms of panels 100 and the road.

In FIGS. 1 and 2, side fairing 100 comprises three horizontal sub-panels, namely lower sub-panel 100A, middle sub-panel 100B and upper sub-panel 100C. Each fairing 100 is secured to an I-beam 2 of Chassis 1 by a number of supporting struts 110. The end of each strut 110 proximate to chassis 1 is rigidly fastened to the I-beam 2, as by welding, or one or two 90 degree metal angle fasteners, bolted or riveted to the I-beam 2 and the strut 110, or by other suitable means. The end of each strut 110 proximate to side fairing 100 is secured to middle sub-panel 100B or to upper sub-panel 100C, depending upon the embodiment, using comparable means.

As can be seen in FIG. 1, the struts 110 are cantilevered, such that the load (both weight and torsional) imposed upon them by the mass of side fairing 100 are transferred to the I-beam 2 entirely through the fastening utilized to secure each strut 110 to the I-beam 2. The side fairing 100 is thereby free-standing, and it is not secured to the underbody of a Truck, which allows a container to be placed on a Chassis freely and quickly, without interference with side fairing 100.

In certain embodiments of the present invention, described below with reference to FIGS. 3A, 3B and 3C, the portions of struts 110 proximate to side fairing 100 are capable of being displaced in the vertical direction in order to allow the fairing 100 to move correspondingly in the event that a container is inadvertently loaded onto Chassis 1 in a misaligned orientation.

Sub-panel 100A can be rigidly attached to sub-panel 100B, or the two sub-panels can be made from one piece of planar material, as preferred. Alternatively, sub-panel 100A can be attached to sub-panel 100B utilizing rotatable or bendable fastening in the manner described in U.S. Provisional Patent Application No. 61/301,941, filed Feb. 5, 2010 and International Patent Application No. PCT/US11/23728, filed Feb. 4, 2011, the contents of each of which are incorporated herein by reference in regard to that embodiment.

Figure 3A:
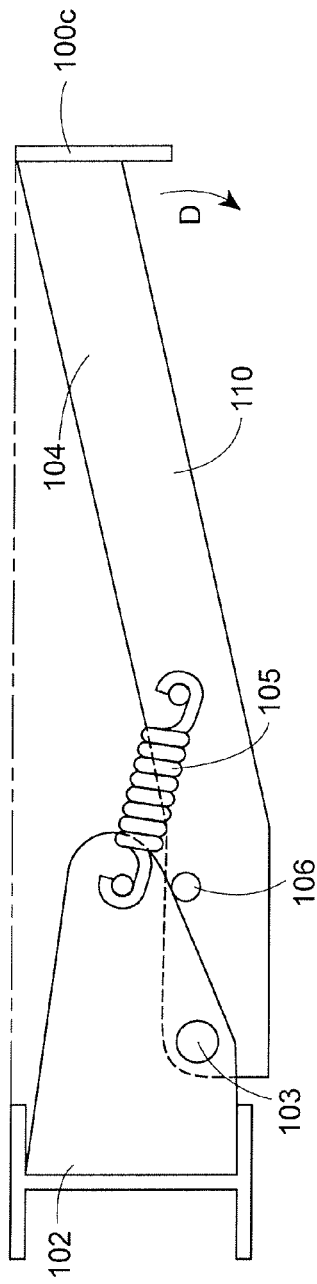
FIGS. 3A, 3B and 3C depict side views of three different types of pivotable struts used to support the side fairing panel in certain embodiments.

FIG. 3A illustrates one embodiment of strut 110 which permits fairing 100 to be deflected in the vertical direction. In this embodiment, strut 110 comprises a mounting trunion 102 and a pivoting arm 104. Pivoting arm 104 is secured to trunion 102 with a pivot pin 103. A biasing means is provided, such as tension spring 105. Tension spring 105, which is secured between mounting trunion 102 and pivoting arm 104, urges arm 104 in the upward direction. Upward displacement is limited by stop pin 106, or other suitable means. Mounting trunion 102 is rigidly fastened to the I-beam 2 in the manner described above, and rigidly fastened in similar manner to upper sub-panel 100C (shown in FIG. 3A) or alternatively, middle sub-panel 100B. The geometry of pivoting arm 104, the placement of stop pin 106 and the position where pivoting arm 104 is secured to side fairing 100 are selected so that the top sub-panel of side fairing 100 is approximately adjacent the container bottom.

Figure 3B:
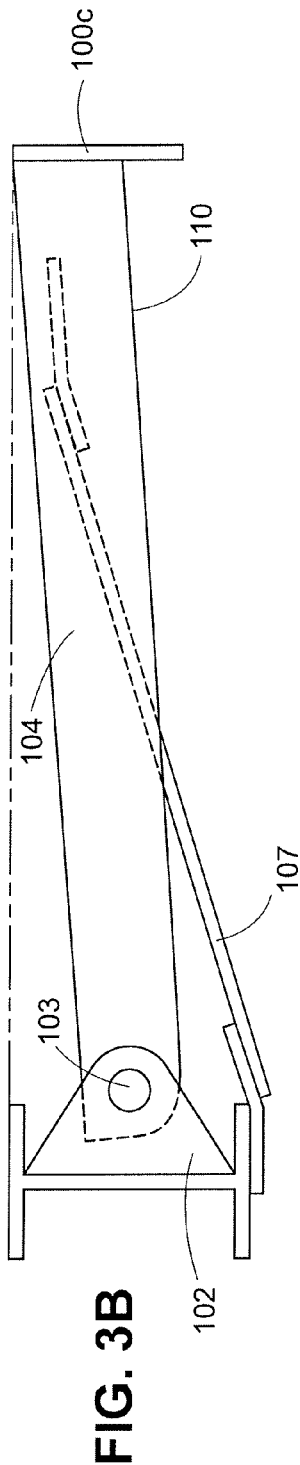

FIG. 3B illustrates an alternate embodiment of strut 110 which permits fairing 100 to be deflected in the vertical direction. In this embodiment, strut 110 comprises a mounting trunion 102 and a pivoting arm 104. Pivoting arm 104 is secured to trunion 102 with a pivot pin 103. FIG. 3B depicts a biasing means, specifically tension arm 107, which is fabricated from spring steel or the like. Tension arm 107 is rigidly secured to the lower flange of the I-beam by welding, bolting or the like, and urges arm 104 in the upward direction. Upward displacement can be limited by suitable design, such as by use of a stop pin or flange (not shown).

In FIG. 3B, mounting trunion 102 is rigidly fastened to the I-beam 2 in the manner described above, and pivoting arm 104 is rigidly fastened in similar manner to upper sub-panel 100C (shown in FIG. 3B) or alternatively, middle sub-panel 100B. The geometry of pivoting arm 104, the placement of any element utilized to limit upward displacement, and the position where pivoting arm 104 is secured to side fairing 100 are selected so that the top sub-panel of side fairing 100 is approximately adjacent the container bottom. Optionally, an element to limit upward displacement can be dispensed with, as in the case where the desired vertical portion of side fairing 100 is achieved when tension arm 107 is in an unstressed state. Tension arm 107 can slide along a suitable bearing surface of pivoting arm 104, as in the case where pivoting arm 104 is a channel section open at the bottom. Alternatively, tension arm 107 can be fastened pivoting arm 104 to enhance its stiffness, as desired.

Figure 3C:
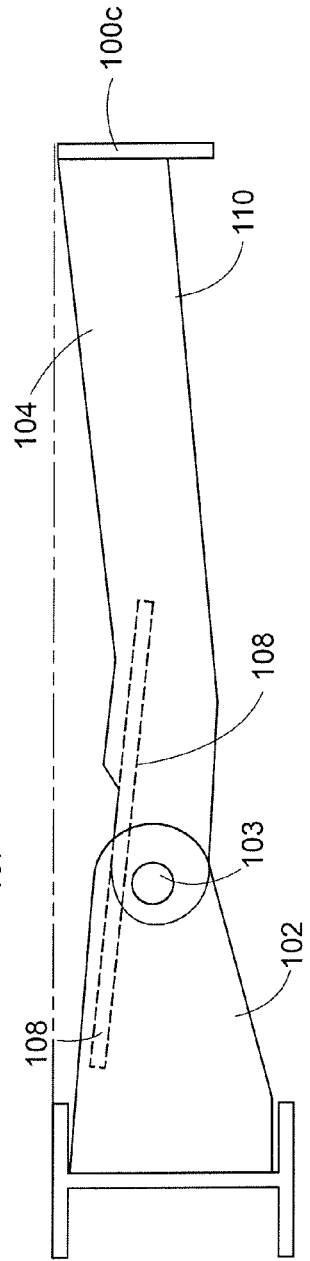

FIG. 3C illustrates a further alternate embodiment of strut 110 which permits side fairing 100 to be deflected in the vertical direction. In this embodiment, strut 110 comprises a mounting trunion 102 and a pivoting arm 104. Pivoting arm 104 is secured to trunion 102 with a pivot pin 103. FIG. 3C depicts a biasing means, specifically tension element 108, which is fabricated from spring steel or the like. Tension element 108, which is positioned above pivot pin 103 to span the underside of suitable bearing surfaces of mounting trunion 102 and pivot arm 104 (such as where each is a channel, appropriately oriented, or a box, in cross section), urges pivoting arm 104 in the upward direction. Upward displacement can be limited by suitable design, such as by use of a stop pin or flange (not shown).

In FIG. 3C, mounting trunion 102 is rigidly fastened to the I-beam 2 in the manner described above, and pivoting arm 104 is rigidly fastened in similar manner to upper sub-panel 100C (shown in FIG. 3C) or alternatively, middle sub-panel 100B. The geometry of pivoting arm 104, the placement of any element utilized to limit upward displacement, and the position where pivoting arm 104 is secured to fairing 100 are selected so that the top sub-panel of side fairing 100 is approximately adjacent the container bottom. Optionally, an element to limit upward displacement can be dispensed with, as in the case where the desired vertical portion of side fairing 100 is achieved when tension element 108 is in an unstressed state.

Figure 4A:
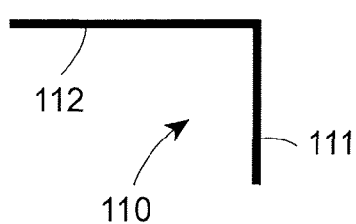
FIGS. 4A, 4B and 4C depict schematic side views of three different types of elastic struts used to support the side fairing panel in certain embodiments.
Figure 4B:
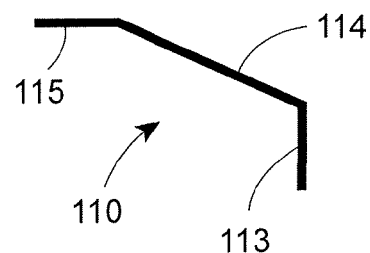
Figure 4C:
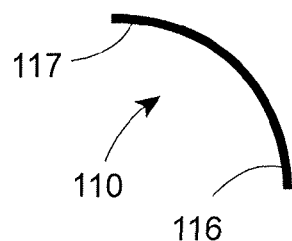

In the embodiments of FIGS. 3A through 3C, provision of pivoting arms permits side fairing 100 to be deflected in the vertical direction. FIGS. 4A through 4C illustrate three alternative embodiments of struts 110. In these embodiments, struts 110 are elastic, thereby permitting side fairing 100 to deflect in the vertical direction, if for example side fairing 100 comes in contact with an intermodal chassis being loaded onto the chassis in a misaligned configuration. These elastic struts 110 urge side fairing 100 in an upward direction, so that fairing 100 returns to its pre-contact position after the container is correctly aligned and positioned on the chassis.

In the embodiment illustrated in FIG. 4A, strut 110 comprises one or more strips of spring steel which have been bent, cut and/or assembled to form two approximately straight sections 111 and 112, with the sections oriented at an appropriate angle, for example 90 degrees as shown. The section 111 of strut 110 is vertically oriented and rigidly fastened to the I-beam 2 using bolts, rivets or the like, and section 112 is horizontally oriented and fastened to fairing 100. The rigidity and vertical displacement of the horizontal section 112 of the strut can be controlled by suitable selection the thickness and stiffness of the spring steel, and by appropriate tempering and quenching treatments. In addition to spring steel, the strut 110 can also be fabricated from composites, plastics and other materials whose elastic characteristics can be managed through design and material selection.

In the embodiment illustrated in FIG. 4B, strut 110 comprises one or more strips of spring steel which have been bent, cut and/or fastened to form three approximately straight sections 113, 114 and 115 in the shape illustrated. Section 113 of strut 110 is vertically oriented and rigidly fastened to the I-beam 2 using bolts, rivets or the like, section 115 is horizontally oriented and fastened to fairing 100, and medial section 114 is diagonally oriented and joins sections 113 and 115. The rigidity and vertical displacement of the horizontal section 115 of the strut 110 can be controlled by appropriate selection of the thickness and stiffness of the spring steel, the angles of the bends, and by appropriate tempering and quenching treatments. In addition to spring steel, the strut can also be fabricated from composites, plastics and other materials whose elastic characteristics can be managed through design and material selection.

In the embodiment illustrated in FIG. 4C, strut 110 comprises one or more strips of spring steel which have been bent, cut and/or fastened to form an arcuate shape, as illustrated. Strut 110 terminates in a vertical portion 116, which is rigidly fastened to an I-beam 2 using bolts, rivets or the like, and terminates in a horizontal portion 117, which is fastened to fairing 100. The rigidity and vertical displacement of the horizontal section of the strut can be controlled via the thickness and stiffness of the spring steel, and the angles of the bends. In addition to spring steel, the strut 110 depicted in FIG. 4C can also be fabricated from composites, plastics and other materials whose elastic characteristics can be managed through design and material selection.

FIG. 5A illustrates an embodiment of the present invention, in which middle sub-panel 100B is rotatably attached to upper sub-panel 100C of panel 100 by means of, for example, a stainless steel piano hinge 41. As an alternative to rotatable attachment, the middle sub-panel 100B is flexibly attached to upper sub-panel 100C of panel 100 by means of, for example, a resilient strip or strips of flexible plastic, rubber or the like spanning the junction between the sub-panels and secured to the sub-panels proximate the junction by suitable means, such as adhesive, fasteners with load distribution plates, and the like. One or more biasing means, such as torsion springs 42, can be utilized to urge sub-panel 100C toward its proper vertical orientation, optionally using one or more stop flanges or the like (not shown) according to the needs of the particular design, to limit the rotation of sub-panel 100C. An angled strip, made of plastic, metal, or other appropriate material is secured to the top portion of sub-panel 100C to insure that the lowering of a container in the vertical direction will cause sub-panel 100C to rotate about pin 44 of piano hinge 41.

FIG. 5B illustrates a further embodiment of the present invention, in which upper sub-panel 100C of panel 100 is made of a flexible material that is rigidly secured to middle sub-panel 100B. The flexible material can be a flexible rubber or rubber-like material, or any other elastic material which returns to its original position after impact, for example, a TPV material. Sub-panel 100C can be removably mounted with rivets, bolts or the like to permit easy replacement.

FIG. 5C illustrates yet another embodiment of the present invention, in which upper sub-panel 100C of panel 100 is made of a vertically oriented flexible bristle material, or other flexible multi-part material, which is rigidly secured to middle sub-panel 100B.

By utilizing the embodiments of FIG. 5A, 5B or 5C the struts 110 can be rigidly attached to Trailer chassis 1, although the FIGS. 5A-5C embodiments optionally can be combined with any of the embodiments of FIGS. 3A-3C, according to preference.

The sub-panels 100A and 100B can be fabricated from sheet steel, aluminum, plastic, or other panel material, and fastened to a structural frame of steel, aluminum, plastic or other stock material to enhance rigidity. However, it is preferred that sub-panels 100A and 100B be fabricated of a plastic having gas injected into it when molten, such as thermoplastic olefin elastomer. Such a plastic will have less weight and a lower cost than a comparable all solid plastic. This plastic will also naturally tend to shed water and minimize snow/ice build-up during inclement winter conditions. In the embodiments of FIGS. 3A, 3B, 3c, and 5A, upper sub-panel 100c can be fabricated of like material.

What is claimed is:

1. A chassis or trailer comprising:
one or more generally longitudinal structural beams and bogie wheels attached thereto, via a bogie wheel mounting assembly, the longitudinal beam(s) generally oriented in the direction of travel, and the chassis or trailer when placed on a road surface defining a spatial gap forward of the wheel mounting assembly between the road surface and the bottom of the trailer or an intermodal container to be carried by the chassis; and
a side fairing system comprising a side fairing panel secured to the trailer or chassis proximate to the gap, the side fairing panel comprising an upper region having an edge and a lower region, the edge of the upper region proximate to the bottom of the trailer or the plane defined by the bottom of an intermodal container when mounted on the chassis,
wherein the lower region of the side fairing panel is relatively rigid and is secured to the trailer or chassis by one or more strut(s) having an inner portion and an outer portion, the inner portion of the strut(s) rigidly secured to the trailer or chassis, the outer portion of the strut(s) secured to the side fairing panel, and
wherein the upper region of the fairing is rotatably or flexibly mounted to the lower region such that the upper region will move from a pre-impact position down toward the road surface upon impact to the upper region from a force component in a direction toward the road surface by the trailer or the intermodal container to be carried by the chassis.

2. The chassis or trailer according to claim 1, further comprising biasing means for urging the upper region towards the pre-impact position.

3. The chassis or trailer according to claim 1, wherein the side fairing panel includes two or more horizontal panels coupled together to function as a single aerodynamic panel.

4. A chassis or trailer comprising:
one or more generally longitudinal structural beams and bogie wheels attached thereto, via a bogie wheel mounting assembly, the longitudinal beam(s) generally oriented in the direction of travel, and the chassis or trailer when placed on a road surface defining a spatial gap forward of the wheel mounting assembly between the road surface and the bottom of the trailer or a load to be carried by the chassis; and
a side fairing system comprising a side fairing panel secured to the trailer or chassis proximate to the gap, the side fairing panel comprising an upper region having an edge and a lower region, the edge of the upper region proximate to the bottom of the trailer or the plane defined by the bottom of an intermodal container when mounted on the chassis,
the side fairing system further comprising a strut having an inner portion and an outer portion, the inner portion of the strut rigidly secured to the trailer or chassis, and the outer portion of the strut rigidly secured to the lower region of the side fairing panel, and
wherein the lower region is relatively rigid and the upper region is constructed from an elastic material and is constructed to flex from an undeflected position in a direction toward the road surface in response to impact to the upper region from a force component in a direction toward the road surface and return substantially or completely to the undeflected position after impact in response to removal of the force component.

5. The chassis or trailer according to claim 4, wherein the side fairing panel includes two or more horizontal panels coupled together to function as a single aerodynamic panel.

6. A chassis or trailer comprising:
one or more generally longitudinal structural beams and bogie wheels attached thereto, via a bogie wheel mounting assembly, the longitudinal beam(s) generally oriented in the direction of travel, and the chassis or trailer when placed on a road surface defining a spatial gap forward of the wheel mounting assembly between the road surface and the bottom of the trailer or a load to be carried by the chassis;
a side fairing panel secured to the trailer or chassis proximate to the gap, the side fairing panel comprising an upper region having an edge and a lower region, the edge of the upper region proximate to the bottom of the trailer or the plane defined by the bottom of an intermodal container when mounted on the chassis; and
a strut having an inner portion and an outer portion, the inner portion of the strut rigidly secured to the trailer or chassis, the outer portion of the strut secured to the side fairing panel to secure the lower region of the side fairing panel to the trailer or chassis,
wherein the lower region is relatively rigid and the upper region is constructed of a flexible multi-part material which is constructed to flex from an undeflected, pre-impact position in a direction toward the road surface upon impact to the upper region from a force component in a direction toward the road surface and which is constructed to return substantially or completely to its original position after impact in response to removal of the force component.

7. The chassis or trailer according to claim 6, wherein the side fairing panel includes two or more horizontal panels or sections coupled together to function as a single aerodynamic panel.

8. A chassis or trailer according to claim 1, wherein the side fairing comprises two or more horizontal panels coupled together to function as a single aerodynamic panel, and the combined panels comprise the upper region having the edge and the lower region.

9. A chassis or trailer according to claim 4, wherein the side fairing comprises two or more horizontal panels coupled together to function as a single aerodynamic panel, and the combined panels comprise the upper region having the edge and the lower region.

10. A chassis or trailer according to claim 6, wherein the side fairing panel comprises two or more horizontal panels coupled together to function as a single aerodynamic unit, and the combined panels comprise the upper region having the edge and the lower region.

11. A side fairing system for a chassis or trailer including one or more generally longitudinal structural beams and bogie wheels attached thereto, via a bogie wheel mounting assembly, the longitudinal beam(s) generally oriented in the direction of travel, and the chassis or trailer when placed on a road surface defining a spatial gap forward of the wheel mounting assembly between the road surface and the bottom of the trailer or an intermodal container to be carried by the chassis, the side fairing system comprising:
a side fairing panel secured to the trailer or chassis proximate to the gap, the side fairing panel comprising an upper region having an edge and a lower region, the edge of the upper region proximate to the bottom of the trailer or the plane defined by the bottom of an intermodal container when mounted on the chassis; and
one or more strut(s),
wherein the lower region of the side fairing panel is relatively rigid and is secured to the trailer or chassis by the strut(s) having an inner portion and an outer portion, the inner portion of the strut(s) rigidly secured to the trailer or chassis, the outer portion of the strut(s) secured to the side fairing panel, and
wherein the upper region of the fairing is rotatably or flexibly mounted to the lower region such that the upper region will move from a pre-impact position down toward the road surface upon impact to the upper region from a force component in a direction toward the road surface by the trailer or the intermodal container to be carried by the chassis.

12. The side fairing system according to claim 11, further comprising biasing means for urging the upper region towards the pre-impact position.

13. The side fairing system according to claim 11, wherein the side fairing panel includes two or more horizontal panels coupled together to function as a single aerodynamic panel.

14. A mounting system according to claim 11, wherein the side fairing comprises two or more horizontal panels coupled together to function as a single aerodynamic panel, and the combined panels comprise the upper region having the edge and the lower region.

15. A side fairing system for chassis or trailer including one or more generally longitudinal structural beams and bogie wheels attached thereto, via a bogie wheel mounting assembly, the longitudinal beam(s) generally oriented in the direction of travel, and the chassis or trailer when placed on a road surface defining a spatial gap forward of the wheel mounting assembly between the road surface and the bottom of the trailer or a load to be carried by the chassis, the side fairing system comprising:
a side fairing panel secured to the trailer or chassis proximate to the gap, the side fairing panel comprising an upper region having an edge and a lower region, the edge of the upper region proximate to the bottom of the trailer or the plane defined by the bottom of an intermodal container when mounted on the chassis; and
a strut having an inner portion and an outer portion, the inner portion of the strut rigidly secured to the trailer or chassis, and the outer portion of the strut rigidly secured to the lower region of the side fairing panel,
wherein the lower region is relatively rigid and the upper region is constructed from an elastic material and is constructed to flex from an undeflected position in a direction toward the road surface in response to impact to the upper region from a force component in a direction toward the road surface and return substantially or completely to the undeflected position after impact in response to removal of the force component.

16. The side fairing system according to claim 15, wherein the side fairing panel includes two or more horizontal panels coupled together to function as a single aerodynamic panel.

17. A side fairing system according to claim 15, wherein the side fairing comprises two or more horizontal panels coupled together to function as a single aerodynamic panel, and the combined panels comprise the upper region having the edge and the lower region.

18. A system for chassis or trailer including one or more generally longitudinal structural beams and bogie wheels attached thereto, via a bogie wheel mounting assembly, the longitudinal beam(s) generally oriented in the direction of travel, and the chassis or trailer when placed on a road surface defining a spatial gap forward of the wheel mounting assembly between the road surface and the bottom of the trailer or a load to be carried by the chassis, the system comprising:
a side fairing panel secured to the trailer or chassis proximate to the gap, the side fairing panel comprising an upper region having an edge and a lower region, the edge of the upper region proximate to the bottom of the trailer or the plane defined by the bottom of an intermodal container when mounted on the chassis; and
a strut having an inner portion and an outer portion, the inner portion of the strut rigidly secured to the trailer or chassis, the outer portion secured to the side fairing panel to secure the lower region of the side fairing panel to the trailer or chassis,
wherein the lower region is relatively rigid and the upper region is constructed of a flexible multi-part material which is constructed to flex from an undeflected, pre-impact position in a direction toward the road surface upon impact to the upper region from a force component in a direction toward the road surface and which is constructed to return substantially or completely to its original position after impact in response to removal of the force component.

19. The system according to claim 18, wherein the side fairing panel includes two or more horizontal panels or sections coupled together to function as a single aerodynamic panel.

20. A system according to claim 18, wherein the side fairing panel comprises two or more horizontal panels coupled together to function as a single aerodynamic unit, and the combined panels comprise the upper region having the edge and the lower region.

* * * * *